April 7, 1953 G. S. BARNES 2,633,942
BRAKE APPLYING HITCH DEVICE
Filed Jan. 5, 1951 2 SHEETS—SHEET 1
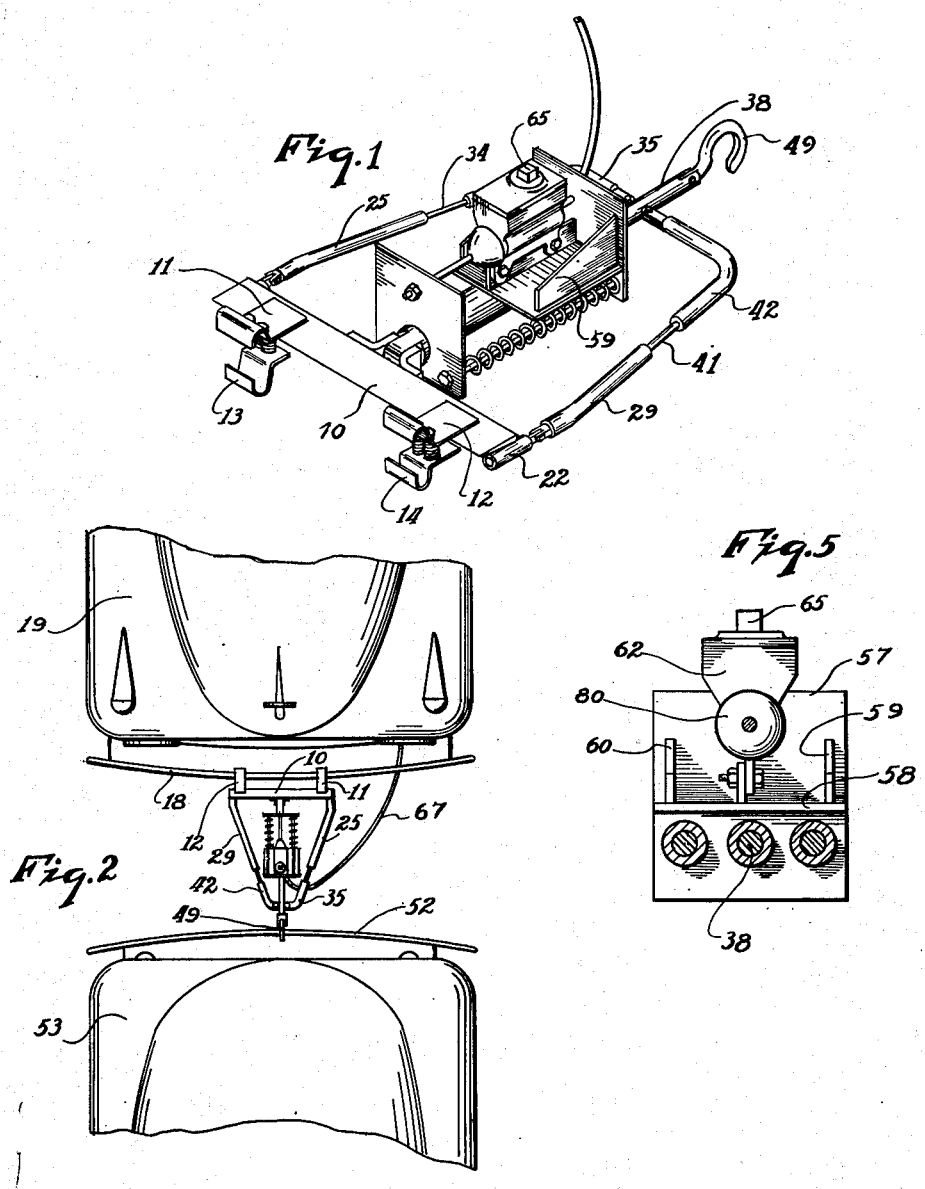
INVENTOR
GERALD S BARNES
BY
L. S. Saulsbury
ATTORNEY April 7, 1953 G. S. BARNES 2,633,942
BRAKE APPLYING HITCH DEVICE
Filed Jan. 5, 1951 2 SHEETS—SHEET 2
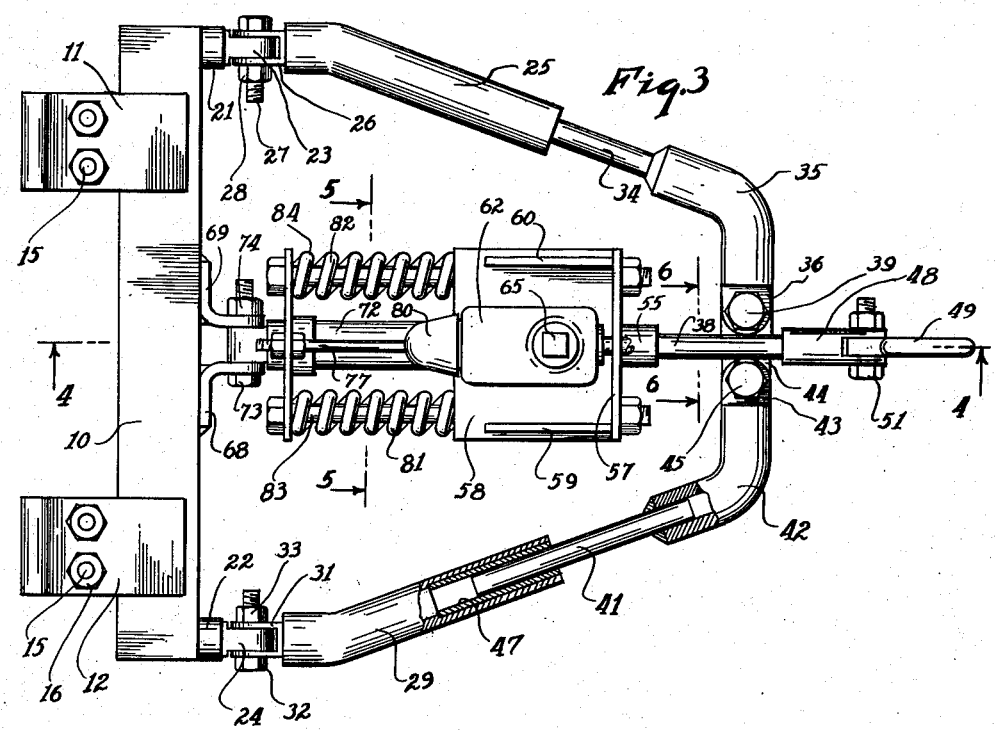
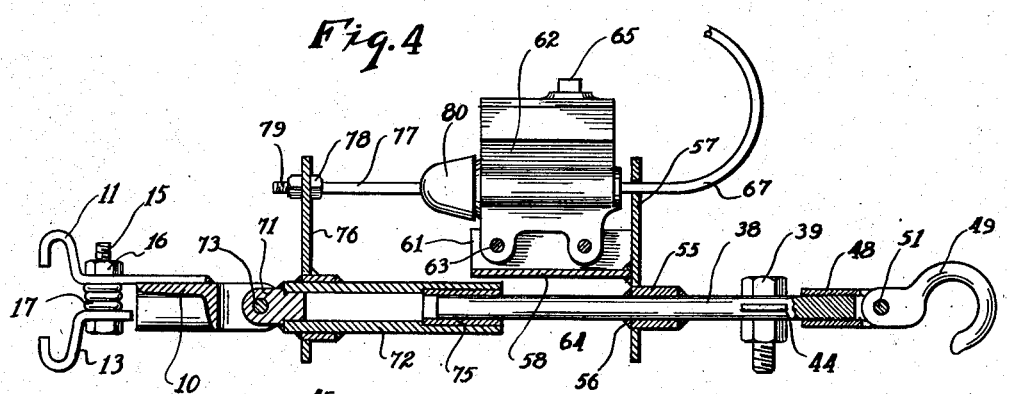
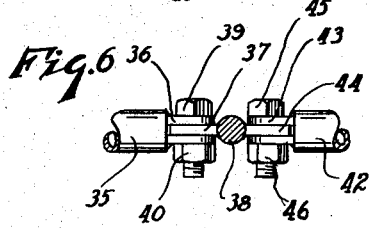
INVENTOR
GERALD S. BARNES
BY
L. S. Saulsbury
ATTORNEY Patented Apr. 7, 1953

2,633,942

UNITED STATES PATENT OFFICE 2,633,942

BRAKE APPLYING HITCH DEVICE

Gerald S. Barnes, Dunkirk, N. Y.

Application January 5, 1951, Serial No. 204,517

1 Claim. (Cl. 188—112)

This invention relates to a brake applying hitch device.

It is an object of the present invention to provide a brake applying hitch device wherein a master cylinder is operated under the action of the hitch device to apply the brakes of the succeeding vehicle which is being towed as when there is a slowing down of the pulling vehicle when moving down a hill and thereby to prevent the over-running of the succeeding vehicle or trailer upon the pulling vehicle.

It is another object of the invention to provide in a brake control hitch bar arrangement a simple means for the mounting of the master operating cylinder and a simple connection for the pull bar element with the slide brace assemblies between which the master cylinder device is connected.

Other objects of the present invention are to provide a control trailer hitch device adapted to operate the brakes of the succeeding vehicle or trailer, which is of simple construction, inexpensive to manufacture, easy to assemble, has a minimum number of parts, easy to connect between the vehicles, compact, rugged and efficient in operation.

For other objects and for a better understanding of the invention, reference may be had to the following detailed description taken in connection with the accompanying drawing, in which Fig. 1 is a perspective view of the brake operating hitch device embodying the features of the present invention.

Fig. 2 is a top plan view of the hitch device connected between the bumpers of two vehicles.

Fig. 3 is an enlarged top plan view of the hitch device with a portion thereof broken away and shown in section.

Fig. 4 is a longitudinal sectional view taken generally on line 4—4 of Fig. 3.

Fig. 5 is a transverse sectional view taken on lines 5—5 of Fig. 3.

Fig. 6 is a fragmentary transverse sectional view taken on line 6—6 of Fig. 3.

Referring now to the figures, 10 represents a transversely extending main plate to which spring attaching grip members 11 and 12 are attached by welding. Below these respective members are grip members 13 and 14 which are respectively connected to the upper members by bolts 15 and nuts 16. The members are kept spaced from one another by spacing rings 17 on the bolts. Any number of spacing rings can be used depending upon the spacing required for the grip members over the bumper 18 of a vehicle 19, Fig. 2, to be towed.

On the respective opposite ends of the transverse member 10 are internally threaded sleeves 21 and 22. Adapted to fit into these respective sleeves are threaded shackle pins 23 and 24.

To the shackle pin 23 there is connected a bent tube 25 having a bifurcated portion 26 that is secured to the pin 23 by a bolt 27 and a nut 28. At the opposite side of the device there is connected a bent tube 29 through its bifurcated portion 31 to the shackle pin 24 by a bolt 32 and a nut 33.

Slidable in the end of bent sleeve 25 is a rod 34 rigidly secured to a bent tube 35 that has on its end bifurcated portions 36 adapted to receive a connecting fin 37 of a pull rod element 38, Fig. 6. The connection with this connecting fin 37 is effected by a bolt 39 and nut 40.

Slidable in the bent tube 29 is a pin 41 which is welded to a bent tube 42 having bifurcated portions 43 that are secured to a connecting fin 44 on the opposite side of the pull rod element 38. The connection is effected with the fin 44 by a bolt 45 and nut 46. In the respective sleeves 25 and 29 are respectively sleeve bearing liners 47. By a pull of the rod 38, the pins 34 and 41 may move respectively out of the bent tubes 25 and 29 and the tubes 35 and 36 can hinge on the respective connecting fins 37 and 44 of the pulling element 38. The outer end of the pull rod element 38 is threaded and receives a threaded sleeve 48 which is bifurcated and receives a hook 49. The connection is effected through a pin 51 with the threaded sleeve 48. This hook 49 can serve to connect the hitch device to a bumper 52 on a pulling vehicle 53, Fig. 2. Connected to the pulling element 38 is a sleeve 55. The connection is effected by welding, as indicated at 56. To this sleeve there is fixed a threadedly extending supporting plate 57 from which there extends rearwardly a horizontal support 58 fixed by braces 59 and 60. In the middle of this support 58 is an upstanding bracket 61 to which a master cylinder device 62 is connected by bolts 63 and 64. This device has a top filling plug 65 and a hose conduit 67 that extends from the forward end thereof and to a brake upon a trailing vehicle. This master cylinder device normally engages the brake of the vehicle except when there is a pull effected through the hitch device by the pulling vehicle 53. Upon moving down hills where there is a tendency for the trailing vehicle 19 to overrun the pulling vehicle, the hitch device automatically applies the brakes of the trailing vehicle.

Fixed to the transverse member 10 are laterally spaced brackets 68 and 69 between which a fitting 71 on the end of a guide sleeve 72 is secured by a bolt 73 and nut 74. In the forward open end of the guide sleeve 72 is a bearing sleeve 75 in which the pulling rod element 38 slides.

Extending vertically from the rear end of the sleeve 72 is a vertical support 76. A piston rod for the master cylinder device is indicated at 77 and extends through the upper portion of the vertical support 76 and is adjustably secured thereto by lock nuts 78 and 79. This piston rod is slidable through a head 80 of the cylinder device. Accordingly, as the vertical supports 57 and 76 tend to separate from one another, the pressure of the fluid of the master cylinder will be decreased. This separation of the vertical supports 57 and 76 is effected through compression springs 81 and 82 surrounding respectively bolts 83 and 84 that extend between the vertical supports and through which a coupled relationship is effected from the pull rod element 38 through the sleeve 72 and the transverse member 10. Upon any slight tendency for the trailing vehicle to over-run the pulling vehicle, the springs 81 and 82 will be compressed and the piston rod 77 will be forced into the cylinder device in order to build up a greater pressure of the fluid and to operate the brakes on the trailing vehicle automatically. At these times, the pins 34 and 41 will respectively slide in the sleeves 25 and 29. The up and down movement of the hitch parts relative to the transverse bar is effected upon the bolts 27, 32 and 73.

It will now be apparent that there has been provided a brake controlling hitch device which is of simple construction, wherein the parts as they are extended or retracted are easily accommodated and wherein the master cylinder is provided on the hitch device and when coupled to the brakes of the trailing vehicle serves to actuate the same upon the tendency of the master cylinder device parts to be forced toward one another to build up the pressure in the fluid line extended to the brakes.

While various changes may be made in the detail construction, it shall be understood that such changes shall be within the spirit and scope of the present invention as defined by the appended claim.

What is claimed is:

In combination with a towing vehicle and a trailing vehicle having brakes, a transversely extending hitch member, gripping means on the transversely extending hitch member for effecting the connection of the device with said trailing vehicle, forwardly extending bent tubes pivotally connected to the ends of the transverse member for vertical pivotal movement and converging forwardly relative to one another, slidable hitch parts slidably connected respectively to the forward ends of the bent tubes and respectively bent inwardly, a pulling rod element having hook means on its forward end and laterally extending connecting fins, pivot bolt means respectively connecting the ends of the slide elements to the respective laterally extending fins of the pull rod element, a pull rod guide sleeve pivotally connected to the transversely extending member for up and down pivotal movement and intermediate the inwardly bent tubes pivotally connected to the ends of the transverse member, said pull rod member slidably connected in the pull rod guide sleeve, vertically extending supports respectively connected to the pull rod member and to the pull rod guide sleeve, a master cylinder device connected between the vertical supports, pull bolts connected between the vertical supports, compression springs disposed respectively upon the pull bolts and normally tending to separate the vertical supports from one another whereby to tend to separate the parts of the master cylinder device, said transverse member and the parts connected therewith being adapted to compress the springs and to operate the master cylinder device to extend fluid under pressure to said brakes of said trailing vehicle upon said trailing vehicle tending to overrun said pulling vehicle.

GERALD S. BARNES.

REFERENCES CITED

The following references are of record in the file of this patent:

UNITED STATES PATENTS

| Number | Name | Date |
|---|---|---|
| 2,513,854 | Fenstermacher | July 4, 1950 |

FOREIGN PATENTS

| Number | Country | Date |
|---|---|---|
| 909,660 | France | May 15, 1946 |